(12) United States Patent
Billard et al.

(10) Patent No.: US 8,512,110 B2
(45) Date of Patent: Aug. 20, 2013

(54) AIR DISTRIBUTION DUCT IN THE PASSENGER COMPARTMENT OF A MOTOR VEHICLE

(75) Inventors: Xavier Billard, Elancourt (FR); Jeremie Coiffier, Orsay (FR)

(73) Assignee: Renault S.A.S., Boulogne Billancourt (FR)

(*) Notice: Subject to any disclaimer, the term of this patent is extended or adjusted under 35 U.S.C. 154(b) by 1421 days.

(21) Appl. No.: 11/917,622

(22) PCT Filed: Jun. 9, 2006

(86) PCT No.: PCT/FR2006/050516
§ 371 (c)(1),
(2), (4) Date: Jul. 18, 2008

(87) PCT Pub. No.: WO2006/134288
PCT Pub. Date: Dec. 21, 2006

(65) Prior Publication Data
US 2009/0104865 A1  Apr. 23, 2009

(30) Foreign Application Priority Data
Jun. 14, 2005 (FR) ...................................... 05 51598

(51) Int. Cl.
*B60H 1/00* (2006.01)
*B60K 37/00* (2006.01)

(52) U.S. Cl.
USPC ...................................... 454/143; 296/193.02

(58) Field of Classification Search
USPC .................................... 454/143; 296/208, 70
See application file for complete search history.

(56) References Cited

U.S. PATENT DOCUMENTS

| | | | | |
|---|---|---|---|---|
| 4,805,522 A * | 2/1989 | Tonoe et al. | .................. | 454/127 |
| 4,806,726 A * | 2/1989 | Rosa et al. | ............... | 219/121.67 |
| 5,095,942 A * | 3/1992 | Murphy | .................... | 137/561 A |
| 5,907,134 A * | 5/1999 | Nording et al. | ............... | 181/228 |
| 6,391,470 B1 | 5/2002 | Schmieder et al. | | |
| 6,668,513 B2 * | 12/2003 | Roberts et al. | ................ | 296/205 |
| 6,705,672 B2 * | 3/2004 | Shikata et al. | ................ | 296/208 |
| 6,715,954 B2 * | 4/2004 | Mainka et al. | ................ | 403/270 |
| 6,834,913 B2 * | 12/2004 | Reed et al. | .................... | 296/208 |
| 7,810,873 B2 * | 10/2010 | Hitz et al. | ................. | 296/193.02 |
| 2002/0153750 A1 * | 10/2002 | Feith et al. | .................... | 296/208 |
| 2003/0122403 A1 * | 7/2003 | Brancheriau | ................. | 296/208 |
| 2004/0135400 A1 * | 7/2004 | Matsuzaki et al. | ........ | 296/193.02 |
| 2007/0056748 A1 * | 3/2007 | Feith et al. | .................... | 166/387 |
| 2009/0256400 A1 * | 10/2009 | Descamps | .................... | 296/205 |

FOREIGN PATENT DOCUMENTS
DE 299 16 470   12/1999
WO 01 70558   9/2001

* cited by examiner

*Primary Examiner* — Steven B McAllister
*Assistant Examiner* — Frances H Kamps
(74) *Attorney, Agent, or Firm* — Oblon, Spivak, McClelland, Maier & Neustadt, L.L.P.

(57) ABSTRACT

The invention relates to an air distribution duct (2) integrated in the passenger compartment of a motor vehicle comprising at least one rigid hollow crossmember (1) that reinforces the structure of the vehicle, characterized in that the duct (2) is made by extrusion and is placed in the crossmember (1) at a distance from the inside wall of the crossmember.

11 Claims, 2 Drawing Sheets

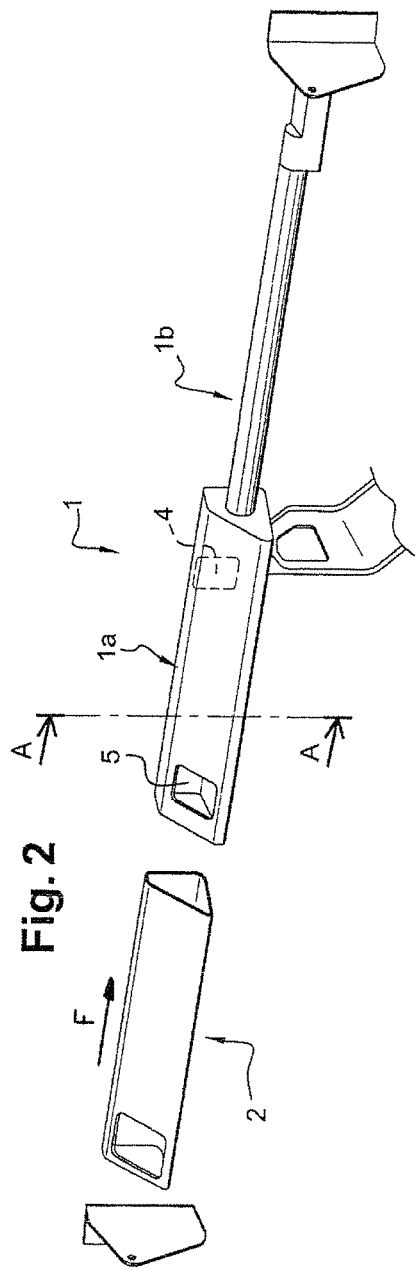
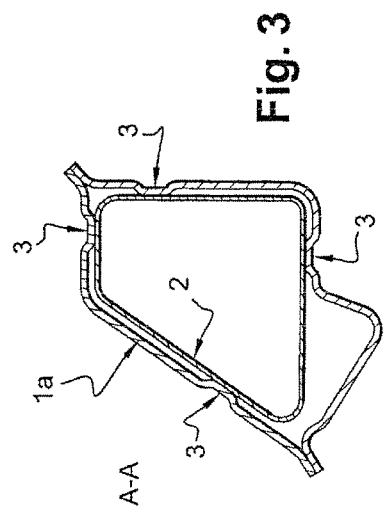

AIR DISTRIBUTION DUCT IN THE PASSENGER COMPARTMENT OF A MOTOR VEHICLE

BACKGROUND

The present invention relates to an air distribution duct for distributing air into the cabin of a motor vehicle, and particularly relates to such a device connected to an air-conditioning unit which allows the air, optionally heated or cooled, to be fed in at various locations of the cabin.

With the increased reduction in the noise nuisance produced by the vehicle engine, the air-conditioning unit has become a significant noise source to which the air distribution device contributes. Owing to the transmissivity of the air ducts of said device, the noise of the fan is propagated right into the cabin. Moreover, these ducts are themselves a source of noise resulting from the flow turbulence generated by their architecture.

The known air distribution devices, generally arranged in the dashboard of the vehicle, also have the disadvantage of occupying a considerable amount of space, this space being complicated to manage at the vehicle design stage.

One solution for reducing their space requirement involves the direct use of a metal crossmember of the vehicle, situated inside the dashboard, to route the air, as described in document FR 2 669 885 (Peugeot). However, this solution has the disadvantage of causing heat losses, the materials forming the crossmember having a higher thermal inertia than those used for conventional distribution ducts. The air circulating in the crossmember then takes longer to heat or cool, resulting in a loss of comfort for the occupants of the vehicle.

Another solution involves placing an air distribution duct inside a crossmember, as described in document DE 102 20 025 (Behr), for example. This duct can be made of an inexpensive material and can be supported inside the crossmember by means of rigid supports fastened to the crossmember. The air layer between the duct and the crossmember then serves as a thermal insulator. Such a device allows the crossmember to be structurally rigid, but no noise absorption is provided, with the result that the duct remains a source of noise.

The thermal and acoustic performance of the air distribution device can be improved by adding elastic or semi-rigid supports which absorb the vibrations of the duct, as described in document U.S. Pat. No. 6,715,954 (Benteler). However, the addition of such supports to the periphery of the duct proves costly to achieve and entails a complicated process of assembling the crossmember, the initial shape of which is greatly modified.

There is thus a need to produce at low cost a compact air distribution device which has good thermal and acoustic insulation and is easy to mount in the vehicle.

BRIEF SUMMARY

Accordingly, the subject of the present invention concerns an air distribution duct integrated into the cabin of a motor vehicle comprising at least one rigid hollow crossmember for reinforcing the structure of the vehicle, characterized in that the duct is obtained by extrusion and is placed in the crossmember at a distance from the inner wall of the crossmember.

Since the extruded duct is situated inside the crossmember, the space requirement for the distribution device is reduced. Moreover, producing the duct by extrusion makes it possible to reduce the quantities of material to be used, and hence the production cost. The rigidity of the extruded duct also enables it to retain a substantially constant cross section when it is clamped in the crossmember, with the resulting advantage of facilitating the air flow in the cabin while guaranteeing the quality of the thermal performance. Finally, the air layer between the duct and the crossmember provides thermal insulation of the duct.

The air distribution device proposed can have the following features, individually or in combination:
- the cross section of said duct is constant along a longitudinal edge;
- the extruded duct has at least two openings intended to circulate the air emanating from an air-conditioning unit toward a vehicle cabin;
- the extruded duct is maintained at a distance from the inner wall of the crossmember by means of protrusions emanating from said crossmember;
- the protrusions are distributed uniformly around the periphery and over the length of the crossmember;
- the extruded duct is made of recyclable material, preferably plastic;
- the crossmember is a hollow body of substantially rectilinear shape that is designed to accommodate the extruded air duct in its cavity;
- the crossmember comprises a hollow crossmember and a tubular crossmember which are joined together by a connecting piece which is tailored to the shapes of the crossmembers and ensures the rigidity of the assembly; and
- the crossmember is intended to be placed inside the motor vehicle instrument panel so as to reinforce it.

The present invention additionally relates to a method of mounting an air distribution device in the cabin of a motor vehicle, wherein the hollow crossmember, the tubular crossmember and the connecting piece are assembled to form the crossmember, the extruded duct is fitted in the hollow crossmember, and the assembly thus assembled is mounted in the instrument panel of the vehicle.

BRIEF DESCRIPTION OF THE DRAWINGS

Other features and advantages of the invention will become apparent on reading the detailed description of an embodiment given by way of non-limiting example with reference to the appended drawings, in which:

FIG. 2 is a schematic perspective representation of an air distribution device according to an embodiment of the invention, FIG. 3 is a schematic representation of a cross section through the hollow crossmember comprising the extruded duct.

DETAILED DESCRIPTION

Figure 1:
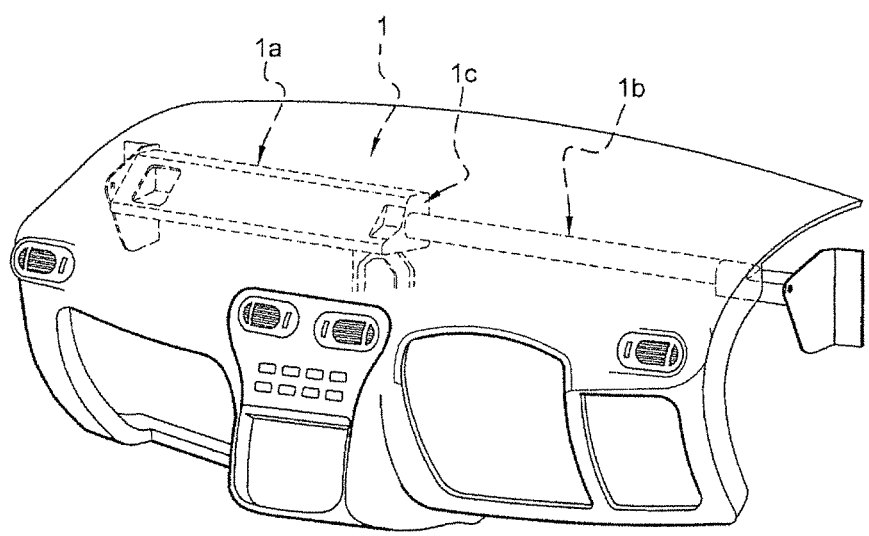
FIG. 1 is a schematic perspective representation of an air distribution device integrated into the instrument panel of a vehicle.

FIG. 1 represents a crossmember 1 for reinforcing the structure of the vehicle. This crossmember 1 is integrated inside the dashboard of the vehicle and supports structural elements such as the speedometer or the air-conditioning unit.

This crossmember 1 is, for example, situated near the lower edge of the windshield, inside the dashboard. It has a hollow closed cross section (FIG. 3) and is made of a rigid material, generally metal.

The distribution duct 2 is made of plastic and produced by extrusion. It is substantially parallelepipedal in shape and has two openings 4 and 5 placed one on each side of the duct. The first opening 4 is intended to receive the air coming from the air-conditioning unit so as to pass it, via the duct 2, toward the second opening 5. The latter is placed in communication with the vehicle cabin in a conventional manner so that the air, optionally heated or cooled, can be fed into said cabin.

As represented in FIG. 2, the air distribution duct 2 is inserted into the crossmember 1. The latter is composed of a hollow part 1a, a tubular part 1b and a connecting piece 1c intended to join together the two parts 1a and 1b of the crossmember. The connecting piece 1c additionally makes it possible to ensure the rigidity of the assembly when the crossmember 1 is mounted inside the dashboard and to close the cavity of the hollow part 1a. The crossmember 1 is joined to the pillars of the body by means of connections (not shown), guaranteeing that the structure of the vehicle body offers effective resistance in the event of a side impact.

As represented in FIG. 3, the duct is supported by protrusions 3 which are formed on the hollow part 1a and distributed uniformly around its periphery and over its entire length so as to maintain a more or less constant separation between the wall of the part 1a and the wall of the duct 2. This separation is preferably more than 3 mm. For greater clarity, it has been exaggerated in the figures.

These protrusions 3 project inside the cavity of the hollow part 1a and serve not only to guide the duct 2 when it is mounted in the part 1a but also to limit the regions of contact between the duct 2 and the part 1a. The reason for this is that a restricted contact area corresponds to a reduction in heat exchanges and to an improvement in thermal performance.

Only the hollow part 1a receives an air distribution duct 2 so as to comply with the geometric constraint that restricts the space of the dashboard. The fact that the structural strength and air distribution functions are combined frees up space which remains available to integrate other functions in the dashboard. The tubular part 1b has smaller dimensions than a conventional crossmember and its reduced space requirement allows the passage of an air distribution duct, which is separate from the tubular part 1b, to supply air to the right-hand part of the vehicle cabin.

The connecting piece 1c has a shape which is compatible with the respective ends of the hollow part 1a and tubular part 1b. It is welded to each of these ends to ensure the rigidity of the entire crossmember 1.

The fact of having a plastic extruded duct 2 of simple shape and of constant cross section along a longitudinal edge makes it possible to reduce the cost of producing such a part and makes it easier to assemble the entire crossmember 1. Specifically, the duct 2 is inserted from the left of the hollow part 1a (in the direction of the arrow F shown in FIG. 2), which then receives the connecting piece 1c on its right. Finally, the tubular part 1b is welded to this connecting piece 1c and the entire crossmember 1 thus assembled is integrated into the vehicle body structure.

Finally, the shape of the duct 2 that results from its extrusion enables it to maintain a constant cross section on account of its inherent rigidity, the effect of which is not only to facilitate the diffusion of air through the distribution device but also to improve the quality of the mounting of the duct in the crossmember 1.

The invention claimed is:

1. An air distribution duct assembly integrated into a cabin of a motor vehicle, comprising:
   a crossmember to reinforce a structure of the vehicle, the crossmember including a hollow part and a tubular part that are joined together by a connecting piece positioned between an end of the hollow part and an end of the tubular part; and
   an air distribution duct obtained by extrusion and placed in the hollow part of the crossmember at a distance from an inner wall of the hollow part of the crossmember.

2. The air distribution duct assembly as claimed in claim 1, wherein a cross section of the duct is constant along a longitudinal edge.

3. The air distribution duct assembly as claimed in claim 1, wherein the extruded duct includes at least two openings configured to circulate air emanating from an air-conditioning unit toward a vehicle cabin.

4. The air distribution duct assembly as claimed in claim 1, wherein the extruded duct is maintained at a distance from the inner wall of the hollow part of the crossmember by protrusions emanating from the hollow part of the crossmember.

5. The air distribution duct assembly as claimed in claim 1, wherein protrusions are distributed uniformly around a periphery and over a length of the hollow part of the crossmember.

6. The air distribution duct assembly as claimed in claim 1, wherein the extruded duct is made of recyclable material, or plastic.

7. The air distribution duct assembly as claimed in claim 1, wherein the hollow part of the crossmember is a hollow body of substantially rectilinear shape configured to accommodate the extruded air duct in its cavity.

8. The air distribution duct assembly as claimed in claim 1, wherein the crossmember is configured to be placed inside an instrument panel of the motor vehicle so as to reinforce the instrument panel.

9. A method of mounting an air distribution duct assembly in a cabin of a motor vehicle as claimed in claim 1, comprising:
   assembling the hollow part, the tubular part, and the connecting piece to form the crossmember;
   fitting the extruded duct in the hollow part; and
   mounting the assembly thus assembled in an instrument panel of the vehicle.

10. The air distribution duct assembly as claimed in claim 1, wherein the duct does not extend into the tubular part of the crossmember.

11. The air distribution duct assembly as claimed in claim 1, wherein a diameter of the tubular part of the crossmember is smaller than a diameter of the duct.

* * * * *